United States Patent
Naveh et al.

(10) Patent No.: US 7,076,672 B2
(45) Date of Patent: Jul. 11, 2006

(54) METHOD AND APPARATUS FOR PERFORMANCE EFFECTIVE POWER THROTTLING

(75) Inventors: Alon Naveh, Ramat Hasharon (IL); Roman Surgutchik, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 10/272,149

(22) Filed: Oct. 14, 2002

(65) Prior Publication Data

US 2004/0071184 A1    Apr. 15, 2004

(51) Int. Cl.
*G06F 1/26* (2006.01)
*G06F 1/28* (2006.01)

(52) U.S. Cl. ...................... 713/300; 713/322
(58) Field of Classification Search ............... 713/300, 713/322
See application file for complete search history.

(56) References Cited

U.S. PATENT DOCUMENTS

| | | | | |
|---|---|---|---|---|
| 5,307,003 A | * | 4/1994 | Fairbanks et al. | 323/222 |
| 5,502,838 A | * | 3/1996 | Kikinis | 713/501 |
| 5,627,412 A | * | 5/1997 | Beard | 307/82 |
| 5,745,375 A | | 4/1998 | Reinhardt et al. | |
| 5,787,294 A | * | 7/1998 | Evoy | 713/320 |
| 5,812,860 A | * | 9/1998 | Horden et al. | 713/322 |
| 5,918,061 A | | 6/1999 | Nikjou | |
| 5,953,685 A | * | 9/1999 | Bogin et al. | 702/136 |
| 6,047,248 A | * | 4/2000 | Georgiou et al. | 702/132 |
| 6,363,490 B1 | * | 3/2002 | Senyk | 713/300 |
| 6,415,388 B1 | | 7/2002 | Browning et al. | |
| 6,714,891 B1 | * | 3/2004 | Dendinger | 702/132 |
| 6,885,233 B1 | * | 4/2005 | Huard et al. | 327/513 |
| 2002/0083356 A1 | | 6/2002 | Dai | |
| 2004/0098631 A1 | | 5/2004 | Terrell, II | |

FOREIGN PATENT DOCUMENTS

| | | |
|---|---|---|
| EP | 1 286 248 A2 | 2/2003 |
| WO | WO 01/35200 A1 | 5/2001 |
| WO | WO 02/17052 A2 | 2/2002 |

OTHER PUBLICATIONS

PCT/US 03/30573, International Search Report, May 28, 2004, Intel Corporation.
Invitation to Pay Additional Fees and Annex (partial International Search) from PCT/US2005/028699, Attorney Docket No. P20418PCT, mailed Mar. 2, 2006, 10 pages.

* cited by examiner

*Primary Examiner*—Chun Cao
*Assistant Examiner*—Ji H. Bae
(74) *Attorney, Agent, or Firm*—Blakely, Sokoloff, Taylor & Zafman LLP

(57) ABSTRACT

An apparatus to determine if a temperature of an electronic device is equal to or exceeds a predetermined threshold. In response to detecting the temperature of the electronic device has at least reached the predetermined threshold, determining a target throttling point for a processor, the target throttling point including a target operating frequency and target operating voltage. Thereafter, dynamically changing a current operating point for the electronic device including a current operating frequency and a current operating voltage by non-contemporaneously changing the current operating frequency to the target operating frequency and the current operating voltage to the target operating voltage. During the changing of the current operating voltage the device is in an active state.

38 Claims, 6 Drawing Sheets

METHOD AND APPARATUS FOR PERFORMANCE EFFECTIVE POWER THROTTLING

FIELD

The present invention relates to the field of thermal management. More particularly, the present invention relates to a method and apparatus for configuring an electronic device to operate in one of a plurality of performance states based on a thermal state.

BACKGROUND

Processor frequency has increased over the last ten years tenfold. For example, processor frequency has increased from 133 mH in the mid 1990s to over 1.6 gig today. The increase was accompanied by a steep rise in power consumption, due both to higher operating frequency as well as leakage of the process required for achieving such higher frequencies. Consequently, the danger of a processor overheating has become much more prevalent and requires a throttling mechanism that can provide efficient power reduction at a reasonable performance cost.

Typically, when the processor is detected as having reached a predetermined thermal state, an auto-throttling logic allows shutting down the clock repeatedly for short periods of time (a few microseconds) in various duty cycles (e.g., a fifty percent duty cycle in most implementations), creating effectively a one half frequency clock.

However, the conventional methodology has several limitations. For example, during the "off" period, interrupts typically cannot be served. Only the effective frequency is reduced. The processor still operates at the same voltage as before and therefore both the voltage contribution to the active power and the voltage contribution to the leakage power are not utilized.

Therefore, the throttling typically achieves only a reduction by half the total power (probably much less due to leakage), at a price of typically one half the performance. In cases where the application has driven down the power much beyond the thermal cooling capability, this may not even be enough to cool the processor down effectively.

BRIEF DESCRIPTION OF THE DRAWINGS

The invention may be best understood by referring to the following description and accompanying drawings that are used to illustrate embodiments of the invention. In the drawings.

DETAILED DESCRIPTION

Reference in this specification to "one embodiment" or "an embodiment" indicates that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be limited by some embodiments and not by others. Similarly, various requirements are described which may be requirements for some embodiments but not other embodiments.

In one embodiment, a technique is disclosed to perform thermal management of an electronic device (e.g., a processor) via voltage and frequency scaling. More specifically, in one embodiment, a unit is provided within a system to monitor the temperature of the electronic device. If the device is detected to have reached or exceeded a predetermined threshold temperature, the voltage and frequency of the electronic device are transitioned down to a target throttle point. In one embodiment, the voltage and frequency of the electronic device are transitioned down to the throttling point using a novel technique for scaling voltage and frequency, wherein the voltage is adjusted in increments while maintaining the electronic device in an active state.

Figure 1:
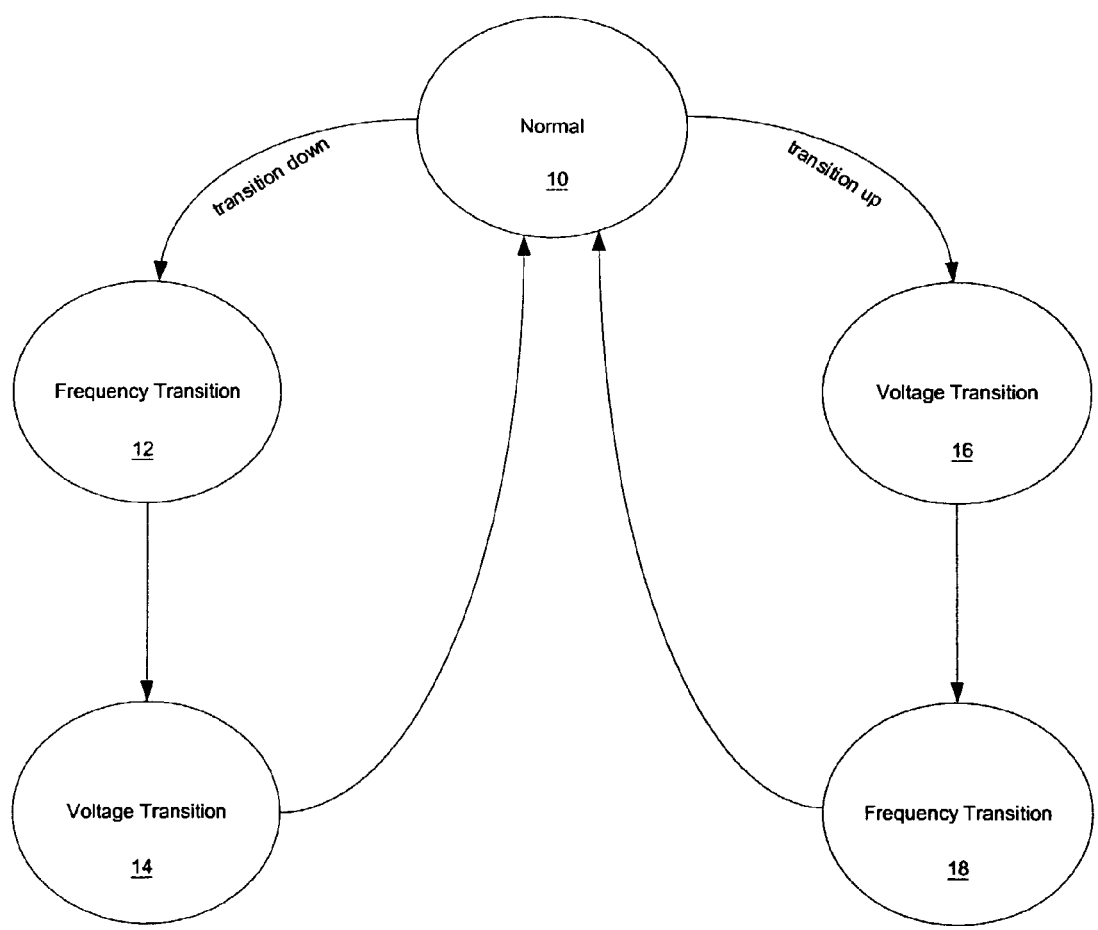
FIG. 1 shows a high-level performance-state transition diagram for an electronic device in accordance with one embodiment of the invention.

The technique for scaling voltage and frequencies, as implemented in to provide thermal management in accordance with one embodiment, will initially be described. As such, FIG. 1 of the drawings shows a state diagram of various states for an electronic device in the form of a processor in accordance with one embodiment. Referring to FIG. 1, reference numeral 10 indicates a normal state of operation for the processor. In this normal state 10, the processor operates at an operating point comprising a current operating frequency and a current operating voltage. In the normal state 10, the performance of the processor is matched to the operating point at which the processor is operating. In other words, the normal state 10 is that state of the processor in which the operating point of the processor is such that the processor is operating at an operating frequency and operating voltage that is what is required both in terms of performance requirements of the processor as well as power consumption requirements.

In one embodiment the processor will leave its normal state 10 if, for example, there is an increased performance requirement in which case the operating point of the processor needs to be raised. Alternatively, the processor leaves its normal state 10 if there is a need to conserve power, in which case the operating point of the processor is lowered. In one case, in order to lower the operating point of the processor to a target operating point that is lower than the operating point associated with the normal state 10, the processor first enters a frequency transition stage 12 in which the operating frequency of the processor is lowered to a value below the operating frequency of the processor in the normal state 10. The particular operations performed during the frequency transition stage 12 will be described in greater detail below.

After execution of the frequency transition stage 12, the processor enters a voltage transition stage 14. During the voltage transition stage 14, the operating voltage of the processor is lowered from the operating voltage associated with the normal state 10 to a target operating voltage which is below the operating voltage associated with the normal state 10. After executing the voltage transition stage 14, the processor is once again in the normal state 10 since the current demands both in terms of processing speed (performance) and power consumption will be matched to the current operating point of the processor.

In another case, in order to transition the operating point of the processor from its operating point in the normal state 10 to a higher operating point, the processor first enters a voltage transition stage 16 in which the operating a voltage associated with a normal state 10 is transitioned to a higher target operating voltage, and after execution of the voltage transition state 16, a frequency transition stage 18 is executed during which an operating frequency of the processor associated with the normal state 10 is transitioned to a higher operating frequency. After execution of the frequency transition stage 18, the processor is once again in the normal state 10 since it will now be operating at an operating point comprising an operating voltage and an operating frequency that is matched to what is required both in terms of power consumption and processor performance. In some embodiments, the voltage transition stages 16 and 14 invoke the same or similar operations, and the frequency transition stages 12 and 18 involve the same or similar operations.

Figure 2:
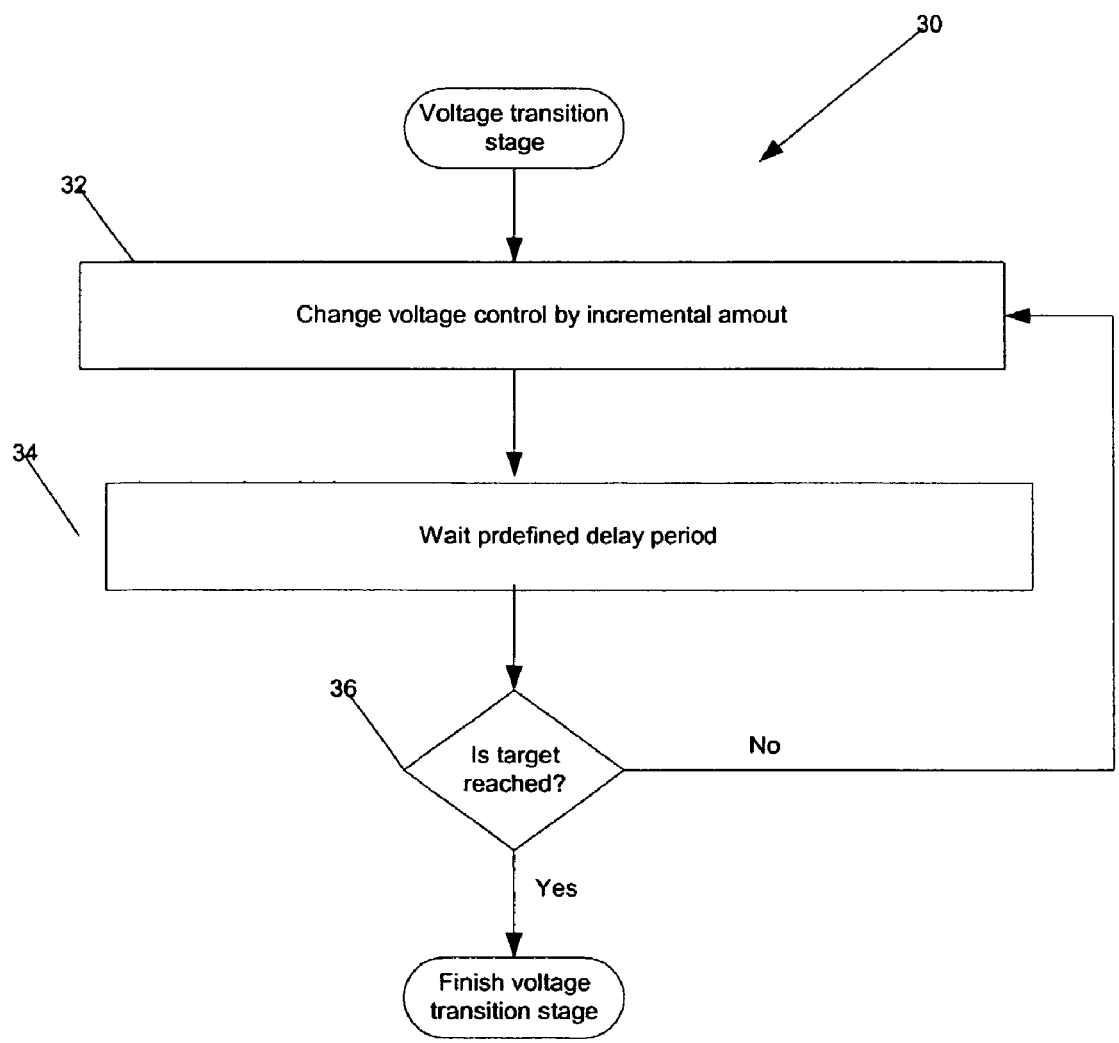
FIG. 2 shows a flowchart of operations performed during a voltage transition stage in accordance with one embodiment of the invention.

Referring now to FIG. 2, reference numeral 30 indicates a flowchart of operations that are performed during voltage transition stages 14 and 16, in accordance with one embodiment of the invention. As noted above, the voltage transition stages 14 and 16 are entered when the processor determines that its current operating voltage is different from a target operating voltage which in the case of the voltage transition stage 14 is lower, and which in the case of the voltage transition stage 16 is higher. At block 32, an operation is performed to change the current operating voltage of the processor by an incremental amount. This incremental amount will be different for different processors, but in one embodiment is a small amount in the range of between 5–50 mV. In one embodiment, the size of each increment is set at a value that represents an incremental voltage change that can be tolerated by a processor without giving rise to operating instability.

At block 34, after changing the voltage incrementally, the processor waits a predefined period during which circuitry of the processor is allowed to adjust to the new operating voltage. Thus, by interspersing each increment in time, clock circuitry and logic timing circuitry associated with the processor are able to continue operation in a manner that is transparent to software. In one embodiment, the predefined waiting period is between 5–30 μs. At block 32, a check is performed to determine if the target operating voltage has been reached. If the target operating voltage has not been reached then block 32 re-executes, otherwise the voltage transition state is exited. During the voltage transition stages 14 and 16, the processor is able to continue executing code and memory transactions on a processor bus coupled to the processor are still possible.

Figure 3:
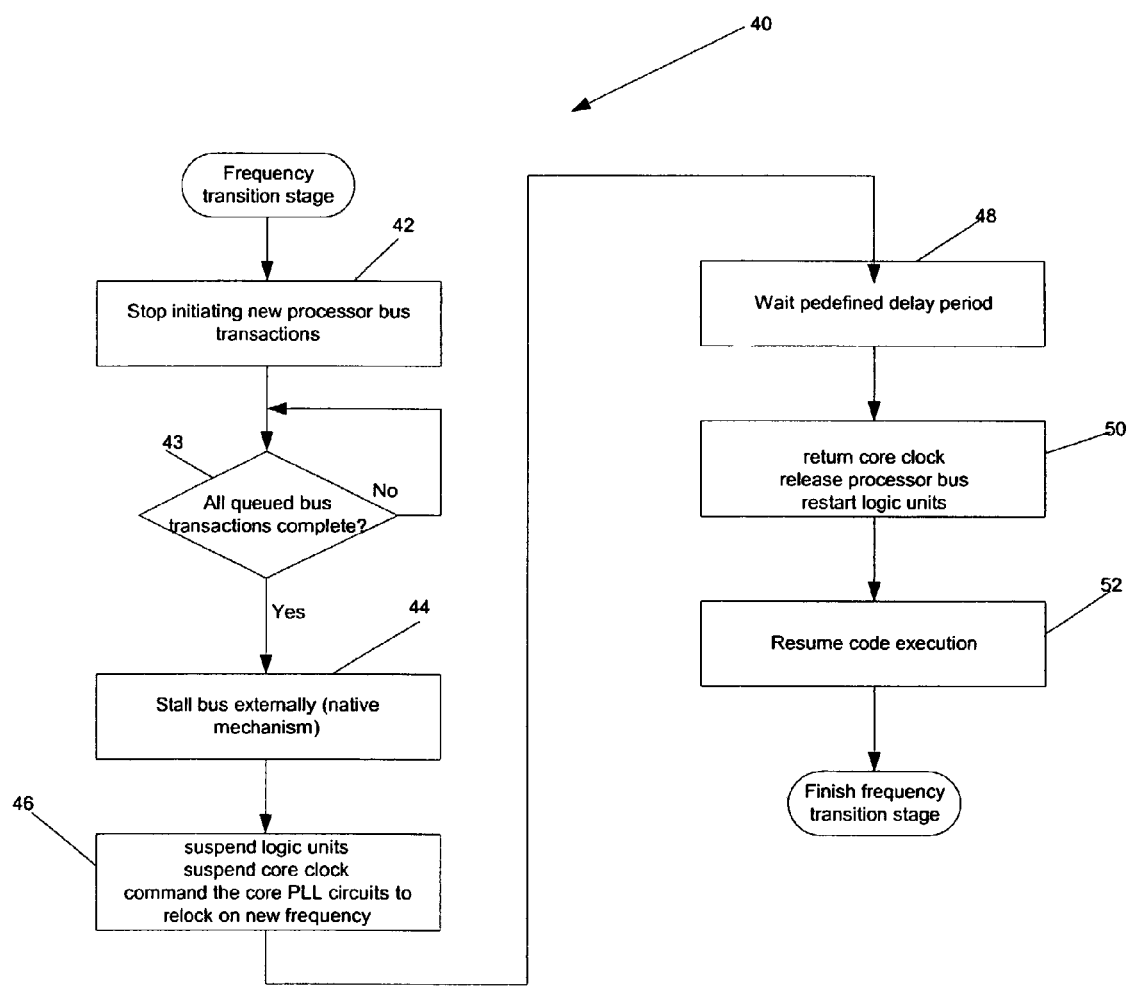
FIG. 3 shows a flowchart of operations performed during a frequency transition stage in accordance with one embodiment of the invention.

Referring now to FIG. 3 of the drawings, reference numeral 40 generally indicates a flowchart of operations performed during the frequency transition stages 12 and 18. At block 42, after entering the frequency transition stage 12, 14 the processor stops initiating new bus transactions. At block 44 a check is performed to determine if all pending bus transactions on the processor bus have been completed. Block 34 is re-executed until all bus pending bus transactions have been completed in which case block 46 is executed. The execution of block 46 includes stalling a processor bus coupled thereto, suspending the logic units of the processor, suspending a first (core) clock, which in one case is a core clock, and commanding phase locked loop circuits for the processor core to be set at the target operating frequency.

After execution of block 46, block 48 executes wherein the processor waits a predefined delay period to allow the core phase locked loop circuits to be re-set. In some cases, the predefined delayed period may be about 10 μs. At block 40, the core clock is returned, the processor bus is released, and the suspended logic units are restarted. Thereafter block 52 executes wherein normal code execution is resumed.

Figure 4:
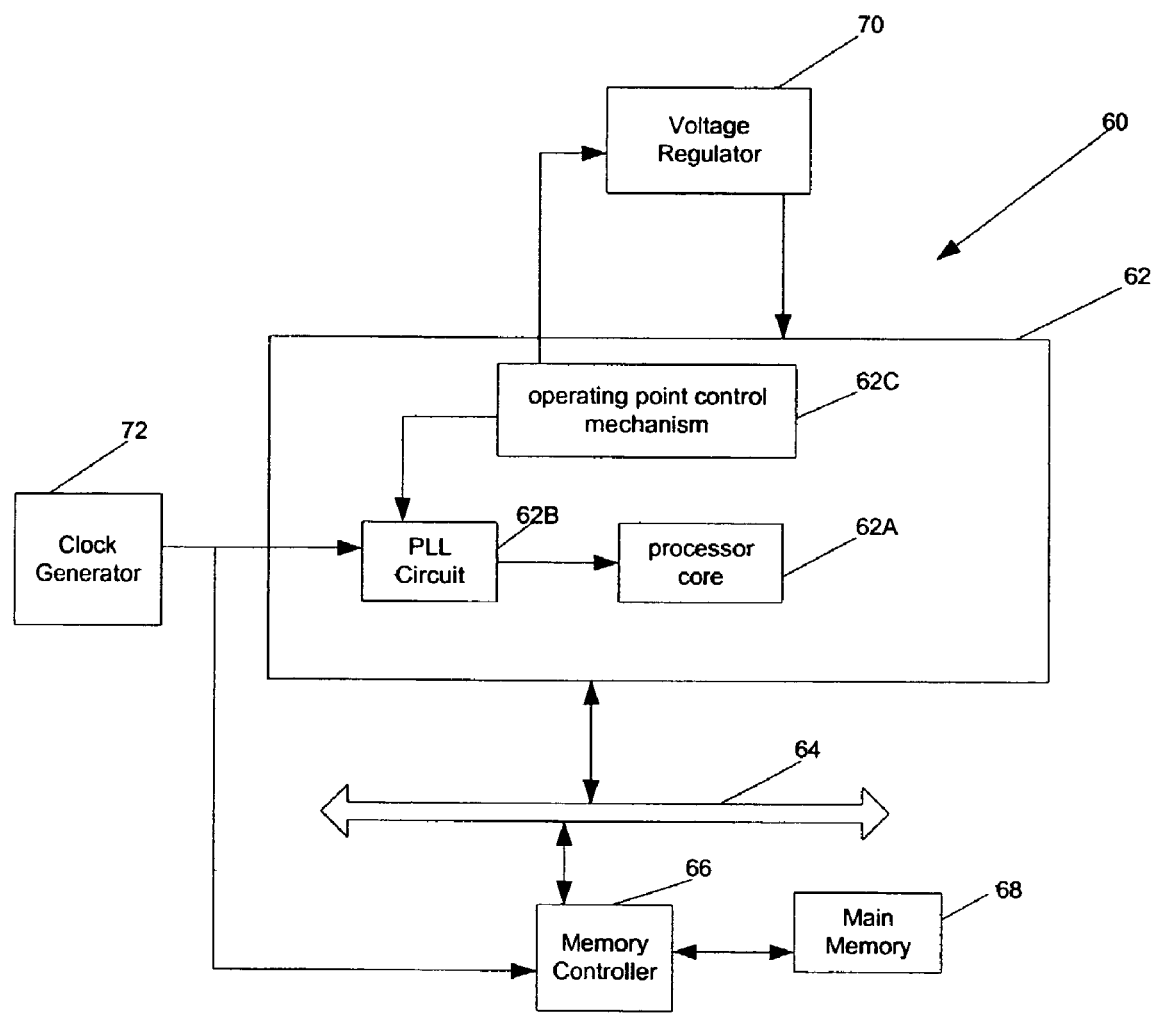
FIG. 4 shows a high-level block diagram a system in accordance with the invention.

Referring to FIG. 4 of the drawings reference numeral 60 generally indicates a system comprising a processor in accordance with one embodiment of the invention. The system 60 includes a processor 62 which is coupled to a memory controller 66 by a processor bus 64. The memory controller 66 controls memory transactions to and from a main memory 68. The processor is connected to a voltage regulator 70 which regulates the output of a voltage supply (not shown) to the processor 62. The processor 62 includes a processor core 62A, which includes functional units such as an arithmetic and logic unit (ALU), etc. A phase locked loop circuit 62B receives a clock signal from a clock generator 72 and scales the revised clock signal, to a required operating frequency, which scaled clock signal is then fed to the processor core 62A.

The processor 62 also includes an operating point control unit 62C which controls both the phase lock loop circuit 62B and the voltage regulator 70. In use, operating point control unit 62C determines whether the current operating point for the processor 62 is higher or lower than a target operating point. In some cases, this determination may include receiving input from an operating system to scale the operating frequency and operating voltage of the processor 62 in accordance with power and/or performance requirements. In some cases, the current operating point may be determined to be higher than the target operating point when the processor is switched from an AC power source to a battery power source or if the operating computational load is reduced. In other cases, if there is a high processing load the current operating point is determined to be lower than the target operating point.

If the target operating point is higher than the current operating point, then the operating point control unit 62C sends control signals to the phase locked loop circuit 62B and the voltage regulator 70 to increase the operating frequency and the operating voltage for the processor 62. Conversely, if the operating point control mechanism 62C determines that the target operating point is lower than the current operating point, then the operating point control unit 62C sends a control signal to the phase locked loop circuit 62B to cause it to lower the current operating frequency to the target operating frequency. Further, the operating point control unit 62C sends a control signal to the voltage regulator 70 to lower the operating voltage for the processor 62.

The actual operations performed by the processor 62 in order to change its operating frequency and operating voltage to the target operating voltage and the target operating frequency correspond to the operations performed during the frequency transition stages 12, 18 and voltage transition stages 14, 16 described with reference to FIG. 1 above. Thus, the voltage transition stage is separated from the frequency transition stage and during a transition down to a lowering operating point, the frequency transition is performed first. During a transition up to a higher operating point, the voltage transition is performed first to allow for the higher frequency operation to follow. In one embodiment processor operation and bus traffic on processor bus 64 are not stopped during the voltage transition stages. Further, to reduce operating instability, the voltage transition is performed in small increments (in one embodiment each increment is about 5–50 mVs), and is interspersed in time (about 0.5 to 30 µs apart in one embodiment) so that processor circuitry is not affected by the transition.

While performing the voltage and frequency transitions in a manner described above, the frequency transition stage may be effected, in one embodiment, within a period of the 5–10 µs. Since during the frequency transition phase, the processor bus 64 is operational, traffic to the processor during the transition stages may be blocked by using native bus mechanisms. This allows for lower time overhead (lower latency and impact) and lower implementation cost in a chipset comprising the processor 62. In one embodiment, the frequency transitioning is controlled entirely from within the processor 62 and there is thus no need for an external device to do this. This saves on processor interface pins.

In some embodiments, the operating point control unit 62C has hard coded therein various operating points. Further the amount of each voltage increment and delay periods necessary to implement the techniques described above are also hard coded within the operating point control unit 62C. In other embodiments, these values may exist in firmware. In yet further embodiments, these values may be programmed partially or fully by software.

Thermal Management

As previously stated at the beginning of the description, in one embodiment, a unit is provided within the computer system to monitor the temperature of the electronic device. If the device is detected to have reached or exceeded a predetermined threshold temperature, the voltage and frequency of the electronic device are transitioned down to a target throttle point. In one embodiment, the voltage and frequency of the electronic device are transitioned down to the throttling point using the method and apparatus as previously described, wherein the electronic device remains in an active state during the transition down and the voltage and frequency are adjusted in increments as previously described.

Figure 5:
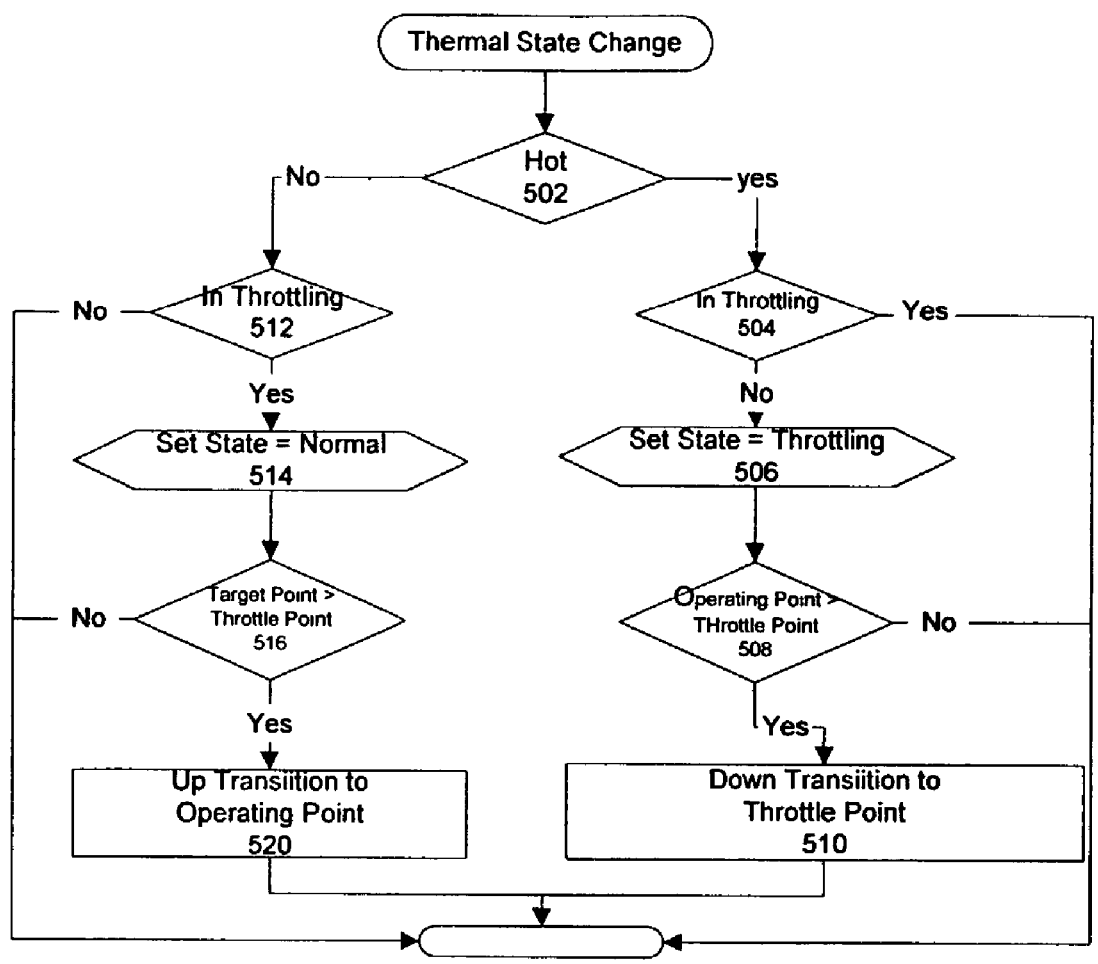
FIG. 5 shows a flowchart of operations performed during the monitoring of the temperature of an electronic devices in accordance with one embodiment of the invention.

FIG. 5 illustrates a flow diagram describing one embodiment the process of adjusting the voltage and frequency of the electronic device in response to detecting the temperature of the electronic device having reached or exceeded the predetermined temperature threshold. In Block 502, a temperature monitor of the electronic device determines if the electronic device has reached or exceeded the predetermined temperature threshold. If the electronic device has exceeded or reached the predetermined temperature threshold, block 504 determines if the electronic device is currently in an active throttling state. If the electronic device is not currently in an active throttling state, in block 506 the electronic device transitions to a throttling state. In one embodiment, an internal flag within the system is set to indicate the electronic devices currently in an active throttling state. In one embodiment, the internal flag set to indicate the active throttling state would be visible to the operating system.

Thereafter, Block 508 determines if a current operating point of the electronic device is greater than a target throttling point, wherein the current operating point may include a current frequency and/or current voltage of the device, as set by current system requirements. If the current operating point is not greater than the targeted throttling point, then the process is complete. If the current operating point is greater than the targeted throttling point, block 510 initiates a down transition to the targeted throttling point. In one embodiment, the transitions down to the targeted throttling point is performed using the techniques as previously described wherein the voltage is changed in increments while the electronic device remains in an active state as is previously described.

In one embodiment, the target throttling point is predetermined. In one embodiment, the predetermined target throttling point is based on the lowest frequency and voltage at which the electronic device may operate. In alternative embodiments, the target throttling point is determined dynamically based on a detected temperature of the electronic device as detected in block 502.

In one embodiment, the process includes continuous monitoring of the temperature of the electronic device, or alternatively periodically checking based on predetermined time increments. In such a case, if the electronic device is detected to have dropped below the predetermined temperature threshold in block 502, block 512 determines if the electronic device is currently in an active throttling state. If block 512 determines the electronic device is not currently in an active throttling state, the process is complete. If block 512 determines the electronic device is currently in an active throttling state, Block 514 transitions the state of the electronic device from an active throttling state to a non-throttling state. In one embodiment, as previously described, the state of the electronic device may be indicated by setting or unsetting an internal flag within the hardware of the system or the electronic device.

After the state of the electronic device has been transitioned to a non-throttling state, block 516 determines if a target operating point is greater than the target throttling point. In one embodiment, the target operating point is set based upon performance demands as determined by applications being processed and/or current system requirements.

If the targeted operating point is determined to be not greater than the targeted throttling point, the process is complete. If the targeted operating point is determined in block 516 to be greater than the targeted throttling point, block 520 transitions the device up to the targeted operating point. In one embodiment, the transitioning up to the targeted operating point includes changing the operating voltage in increments while the electronic device remains in an active state as is previously described in the foregoing.

As previously described in one embodiment, the process of adjusting the frequency and voltage of the electronic device in response to detecting the electronic device reaching or exceeding a predetermined threshold temperature, is a continuous monitoring process, or a process of continuously checking the temperature of the electronic device in predetermined time intervals.

Figure 6:
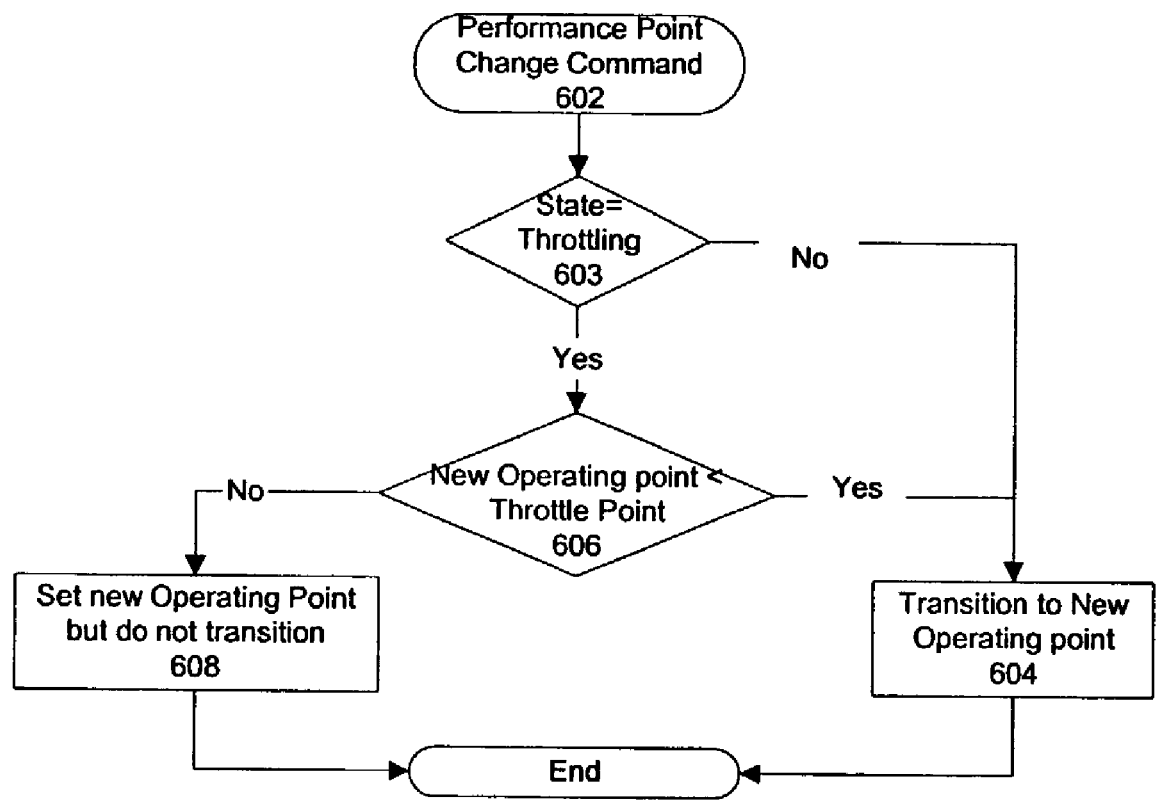
FIG. 6 shows a flowchart of operations performed in response to a performance point change command in accordance with one embodiment of the invention.

In one embodiment, request to increase the operating frequency (due to a need for higher performance or other performance point policy requirements) by moving to a higher operating point during an active throttling period will be deferred until throttling period has ended. However, request to lower the frequency by moving to an operating point lower than the targeted throttling point will be executed. For example, the flow diagram of FIG. 6 describes the process of responding to a performance operating point change command, according to one embodiment. In Block 602, a performance operating point change command is received. In response, Block 603 determines if the electronic device is currently in an active throttling state. If the electronic device is not currently in an active throttling state, block 604, transitions the device to the new operating point as requested. In one embodiment, the transitions to the new operating point is performed by changing the operating voltage and operating frequency as previously described above, wherein the operating voltage is changed in increments while the electronic device remains in a current active state.

If block 603 determines the electronic device is currently in an active throttling state, block 606 determines whether the requested new operating point is less than a current target throttling point. In one embodiment, the current target throttling point can be stored in hardware (accessible). For example, a register of one electronic device. If block 606 determines the new operating point is less than the target throttling point, Block 604 transitions to the new operating point. If Block 606 determines the new operating point is not less than the targeted throttling point, the process does not transition to the new operating point, and Block 608 stores the new operating point for future reference when the electronic device is no longer in the throttle state.

The logic to perform the processes as described above can be implemented in hardware within the electronic device, or alternatively external to the device. The processes described above can also be stored in the memory of a computer system as a set of instructions to be executed. In addition, the instructions to perform the operations described above could alternatively be stored on other forms of machine-readable media, including magnetic and optical disks. For example, the operations of one embodiment could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the processes to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
   determining if a temperature of an electronic device is equal to or exceeds a predetermined threshold;
   in response to detecting the temperature of the electronic device has at least reached the predetermined threshold, determining a target throttling point for a processor, the target throttling point including a target operating frequency and target operating voltage;
   dynamically changing a current operating point for the electronic device including a current operating frequency and a current operating voltage by non-contemporaneously changing the current operating frequency to the target operating frequency and the current operating voltage to the target operating voltage, during the changing of the current operating voltage the device is in an active state;
   wherein during changing the current operating frequency, a bus coupled to the device is stalled, a first clock for the device is stopped, and a phase locked loop circuit for the first clock is set to the target operating frequency.

2. The method of claim 1, wherein the active state includes the device performing one of executing instructions and processing input/output operations on a bus.

3. The method of claim 1, further including in response to determining the temperature of the electronic device is equal to or exceeds the predetermined threshold, determining if the device is currently in a throttling state;
   in response to determining the device is not in the throttling state, determining if the current operating point is greater than the target throttling point;
   in response to determining the current operating point is greater than the target throttling point, performing the dynamically changing to transition the device down to the target throttling point.

4. The method of claim 1, wherein in response to determining the temperature of the electronic device is below the predetermined threshold, determining if the electronic device is currently in the throttling state;
   in response to the electronic device being in the throttling state, determining if a target operating point is greater than the target throttling point;
   in response to determining the target operating point is greater than the target throttling point, performing the dynamically changing to transition the device up to the target operating point.

5. The method of claim 1, further comprising in response to receiving a performance operating point change command, determining if the electronic device is in an active throttling state;
   in response to determining the electronic device is currently in the active throttling state, determining if a new operating point of the performance point change command is less than a target throttling point;
   in response to determining the new operating point is less than the target throttling point, performing the dynamically changing to transition to the new operating point.

6. The method of claim 1, wherein dynamically changing the current operating frequency is performed before changing the current operating voltage if the target throttling point is below the current operating point.

7. The method of claim 1, wherein changing the current operating voltage is performed before changing the current operating frequency if the target operating point is above the current operating point.

8. The method of claim 1, wherein changing the current operating voltage is performed in increments.

9. The method of claim 8, wherein each increment is between 10 mV to 20 mV.

10. The method of claim 8, wherein each increment is at most 16 mV.

11. The method of claim 8, further comprising waiting a predefined period between each increment.

12. The method of claim 11, wherein the predefined period is at least 15 μs.

13. The method of claim 1, wherein the dynamic changing is done in 10 μs or less.

14. An electronic device comprising:
   A first unit to determine if a temperature of an electronic device is equal to or exceeds a predetermined threshold, and in response to detecting the temperature of the electronic device has at least reached the predetermined threshold, determining a target throttling point for a processor, the target throttling point including a target operating frequency and target operating voltage; and a second unit to dynamically change a current operating point for the electronic device including a current operating frequency and a current operating voltage by non-contemporaneously changing the current operating frequency to the target operating frequency and the current operating voltage to the target operating voltage, during the changing of the current operating voltage the device is in an active state;

wherein during changing the current operating frequency, a bus coupled to the device is stalled, a first clock for the device is stopped, and a phase locked loop circuit for the first clock is set to the target operating frequency.

15. The electronic device of claim 14, wherein the active state includes the device performing one of executing instructions and processing input/output operations on a bus.

16. The electronic device of claim 14, wherein in response to determining the temperature of the electronic device is equal to or exceeds the predetermined threshold, the second unit further determines if the device is currently in a throttling state;
   in response to determining the device is not in the throttling state, the second unit determines if the current operating point is greater than the target throttling point;
   in response to determining the current operating point is greater than the target throttling point, the second unit performs the dynamically changing to transition the device down to the target throttling point.

17. The electronic device of claim 14, wherein in response to determining the temperature of the electronic device is below the predetermined threshold, the second unit determines if the electronic device is currently in the throttling state;
   in response to the electronic device being in the throttling state, the second unit determines if a target operating point is greater than the target throttling point;
   in response to determining the target operating point is greater than the target throttling point, the second unit performs the dynamically changing to transition the device up to the target operating point.

18. The electronic device of claim 14, wherein in response to receiving a performance operating point change command, the second unit determines if the electronic device is in an active throttling state;
   in response to determining the electronic device is currently in the active throttling state, the second unit determines if a new operating point of the performance point change command is less than a target throttling point;
   in response to determining the new operating point is less than the target throttling point, the second unit performs the dynamically changing to transition to the new operating point.

19. The electronic device of claim 14, wherein the second unit changes the current operating voltage in increments.

20. The electronic device of claim 19, the second unit waits a predefined period between each increment.

21. The electronic device of claim 14, wherein the second unit performs the dynamic changing in 10 µs or less.

22. A system comprising:
A memory device;
A first unit, coupled to the memory, to determine if a temperature of an electronic device is equal to or exceeds a predetermined threshold, and in response to detecting the temperature of the electronic device has at least reached the predetermined threshold, determining a target throttling point for a processor, the target throttling point including a target operating frequency and target operating voltage; and a second unit, coupled to the first unite, the second unit to dynamically change a current operating point for the electronic device including a current operating frequency and a current operating voltage by non-contemporaneously changing the current operating frequency to the target operating frequency and the current operating voltage to the target operating voltage, during the changing of the current operating voltage the device is in an active state;

wherein during changing the current operating frequency, a bus coupled to the device is stalled, a first clock for the device is stopped, and a phase locked loop circuit for the first clock is set to the target operating frequency.

23. The system of claim 22, wherein the active state includes the device performing one of executing instructions and processing input/output operations on a bus.

24. The system of claim 22, wherein in response to determining the temperature of the electronic device is equal to or exceeds the predetermined threshold, the second unit further determines if the device is currently in a throttling state;
   in response to determining the device is not in the throttling state, the second unit determines if the current operating point is greater than the target throttling point;
   in response to determining the current operating point is greater than the target throttling point, the second unit performs the dynamically changing to transition the device down to the target throttling point.

25. The system device of claim 22, wherein in response to determining the temperature of the electronic device is below the predetermined threshold, the second unit determines if the electronic device is currently in the throttling state;
   in response to the electronic device being in the throttling state, the second unit determines if a target operating point is greater than the target throttling point;
   in response to determining the target operating point is greater than the target throttling point, the second unit performs the dynamically changing to transition the device up to the target operating point.

26. The system of claim 22, wherein in response to receiving a performance operating point change command, the second unit determines if the electronic device is in an active throttling state;
   in response to determining the electronic device is currently in the active throttling state, the second unit determines if a new operating point of the performance point change command is less than a target throttling point;
   in response to determining the new operating point is less than the target throttling point, the second unit performs the dynamically changing to transition to the new operating point.

27. The system of claim 22, wherein the second unit changes the current operating voltage in increments.

28. The system of claim 27 the second unit waits a predefined period between each increment.

29. The system of claim 22, wherein the second unit performs the dynamic changing in 10 µs or less.

30. A computer readable storage medium having stored thereon a set of instructions, which when executed by a processor perform a method comprising:

determining if a temperature of an electronic device is equal to or exceeds a predetermined threshold;

in response to detecting the temperature of the electronic device has at least reached the predetermined threshold, determining a target throttling point for a processor, the target throttling point including a target operating frequency and target operating voltage;

dynamically changing a current operating point for the electronic device including a current operating frequency and a current operating voltage by non-contemporaneously changing the current operating frequency to the target operating frequency and the current operating voltage to the target operating voltage, during the changing of the current operating voltage the device is in an active state;

wherein during changing the current operating frequency, a bus coupled to the device is stalled, a first clock for the device is stopped, and a phase locked loop circuit for the first clock is set to the target operating frequency.

31. The computer readable storage medium of claim 30, wherein the active state includes the device performing one of executing instructions and processing input/output operations on a bus.

32. The computer readable storage medium of claim 30, wherein the method further include in response to determining the temperature of the electronic device is equal to or exceeds the predetermined threshold, determining if the device is currently in a throttling state;

in response to determining the device is not in the throttling state, determining if the current operating point is greater than the target throttling point;

in response to determining the current operating point is greater than the target throttling point, performing the dynamically changing to transition the device down to the target throttling point.

33. The computer readable storage medium of claim 30, wherein in response to determining the temperature of the electronic device is below the predetermined threshold, determining if the electronic device is currently in the throttling state;

in response to the electronic device being in the throttling state, determining if a target operating point is greater than the target throttling point;

in response to determining the target operating point is greater than the target throttling point, performing the dynamically changing to transition the device up to the target operating point.

34. The computer readable storage medium of claim 30, wherein the method further includes in response to receiving a performance operating point change command, determining if the electronic device is in an active throttling state;

in response to determining the electronic device is currently in the active throttling state, determining if a new operating point of the performance point change command is less than a target throttling point;

in response to determining the new operating point is less than the target throttling point, performing the dynamically changing to transition to the new operating point.

35. The computer readable storage medium of claim 30, wherein changing the current operating voltage is performed in increments.

36. The computer readable storage medium of claim 30, wherein the method further includes waiting a predefined period between each increment.

37. The computer readable storage medium of claim 30, wherein determining the target operating point is based on current performance requirements of a system.

38. The computer readable storage medium of claim 30 wherein the dynamic changing is done in 10 μs or less.

* * * * *